United States Patent
Flint et al.

(10) Patent No.: US 7,835,111 B2
(45) Date of Patent: Nov. 16, 2010

(54) MAGNETIC WRITE HEAD WITH UPPER RETURN POLE OPTIMIZATION FOR REDUCED TRAILING SHIELD PROTRUSION

(75) Inventors: Eric Wayne Flint, San Jose, CA (US); Wen-Chien David Hsiao, San Jose, CA (US); Edward Hin Pong Lee, San Jose, CA (US); Michael Ming Hsiang Yang, San Jose, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 942 days.

(21) Appl. No.: 11/675,516

(22) Filed: Feb. 15, 2007

(65) Prior Publication Data
US 2008/0232000 A1   Sep. 25, 2008

(51) Int. Cl.
*G11B 5/147* (2006.01)
(52) U.S. Cl. .................. 360/125.16; 360/125.22; 360/125.25; 360/125.3
(58) Field of Classification Search ............ 360/125.16, 360/125.3, 125.22, 125.23, 125.25, 125.56, 360/125.57
See application file for complete search history.

(56) References Cited

U.S. PATENT DOCUMENTS

| | | | |
|---|---|---|---|
| 6,594,112 B1 | 7/2003 | Crue et al. | 360/126 |
| 7,199,973 B2* | 4/2007 | Lille | 360/123.09 |
| 7,446,980 B2* | 11/2008 | Le | 360/319 |
| 2005/0128637 A1* | 6/2005 | Johnston et al. | 360/125 |
| 2005/0141137 A1 | 6/2005 | Okada et al. | 360/122 |
| 2005/0259356 A1* | 11/2005 | Han et al. | 360/126 |
| 2005/0280936 A1 | 12/2005 | Sasaki et al. | 360/126 |
| 2005/0280937 A1 | 12/2005 | Sasaki et al. | 360/126 |
| 2005/0280939 A1 | 12/2005 | Sasaki et al. | 360/126 |
| 2006/0023351 A1 | 2/2006 | Chiu et al. | 360/123 |
| 2006/0061907 A1 | 3/2006 | Sasaki et al. | 360/126 |
| 2006/0082924 A1 | 4/2006 | Etoh et al. | 360/125 |
| 2006/0087765 A1 | 4/2006 | Iwakura et al. | 360/125 |
| 2006/0092564 A1 | 5/2006 | Le | 360/126 |
| 2006/0103980 A1* | 5/2006 | Sasaki et al. | 360/126 |
| 2006/0126223 A1 | 6/2006 | Kameda | 360/126 |
| 2006/0171072 A1 | 8/2006 | Watabe et al. | 360/126 |
| 2006/0203379 A1 | 9/2006 | Hirata et al. | 360/125 |
| 2006/0203383 A1 | 9/2006 | Kobayashi | 360/126 |
| 2007/0146929 A1* | 6/2007 | Maruyama et al. | 360/125 |
| 2009/0059427 A1* | 3/2009 | Kudo et al. | 360/125.3 |
| 2009/0147410 A1* | 6/2009 | Jiang et al. | 360/319 |

FOREIGN PATENT DOCUMENTS

| | | |
|---|---|---|
| JP | 2006-139839 | 6/2006 |
| JP | 2006-216098 | 8/2006 |

* cited by examiner

*Primary Examiner*—Jefferson Evans
(74) *Attorney, Agent, or Firm*—Zilka-Kotab, PC

(57) ABSTRACT

A magnetic write head for perpendicular magnetic recording that is resistant to write pole and trailing shield protrusion. The write pole includes a magnetic return pole that is magnetically connected with the trailing shield, the return pole being resistant to deformation or recession such as from mechanically abrasive slider cleaning operations such as soda blast.

20 Claims, 7 Drawing Sheets

MAGNETIC WRITE HEAD WITH UPPER RETURN POLE OPTIMIZATION FOR REDUCED TRAILING SHIELD PROTRUSION

FIELD OF THE INVENTION

The present invention relates to perpendicular magnetic recording and more particularly to a method for manufacturing a write head for perpendicular magnetic recording that has an upper return pole design that prevents trailing shield protrusion.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write beads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air hearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, referred to as a spacer layer, sandwiched between first and second ferromagnetic layers, referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a potion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos Θ, where Θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

In order to increase the field gradient of such perpendicular magnetic write heads, some researchers have worked to develop a write head with a trailing magnetic shield. Such a shield draws write field toward it, which cants the write field at an angle, thereby increasing the field gradient and switching speed. However, manufacturing processes used in the construction of sliders have been found to cause protrusion of these trailing shields. For example, mechanically abrasive processes such as soda blast used to clean the slider after lapping have been found to cause trailing shield protrusion by recessing surrounding structures.

Such trailing shield protrusion can decrease writer performance, and at the very low fly heights of current write heads can also lead to head disk contact. Therefore there is a strong felt need for a write heat design that can reduce this trailing shield protrusion.

SUMMARY OF THE INVENTION

The present invention provides a write head design that prevents trailing shield and write pole protrusion. The write bead has an upper return pole that is designed to withstand mechanically abrasive slider cleaning operations such as soda blasting without deforming or recessing from the air bearing surface. An upper return pole according to an embodiment of the invention has an increased throat height that provides the return pole with increased strength to resist recession or deformation.

The upper return pole can also be configured to have a narrow width as viewed from the air bearing surface (ABS). This decreased width increases the return pole's resistance to mechanically induced deformation, and also advantageously reduces the formation of seams or voids in an above applied alumina protective layer.

In another embodiment of the invention, the upper return pole can be a two piece structure including a pedestal portion and a Milan pole portion. The pedestal portion is braced by a strong, hard alumina fill layer that can extend from the upper return pole pedestal to an upper write coil portion.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
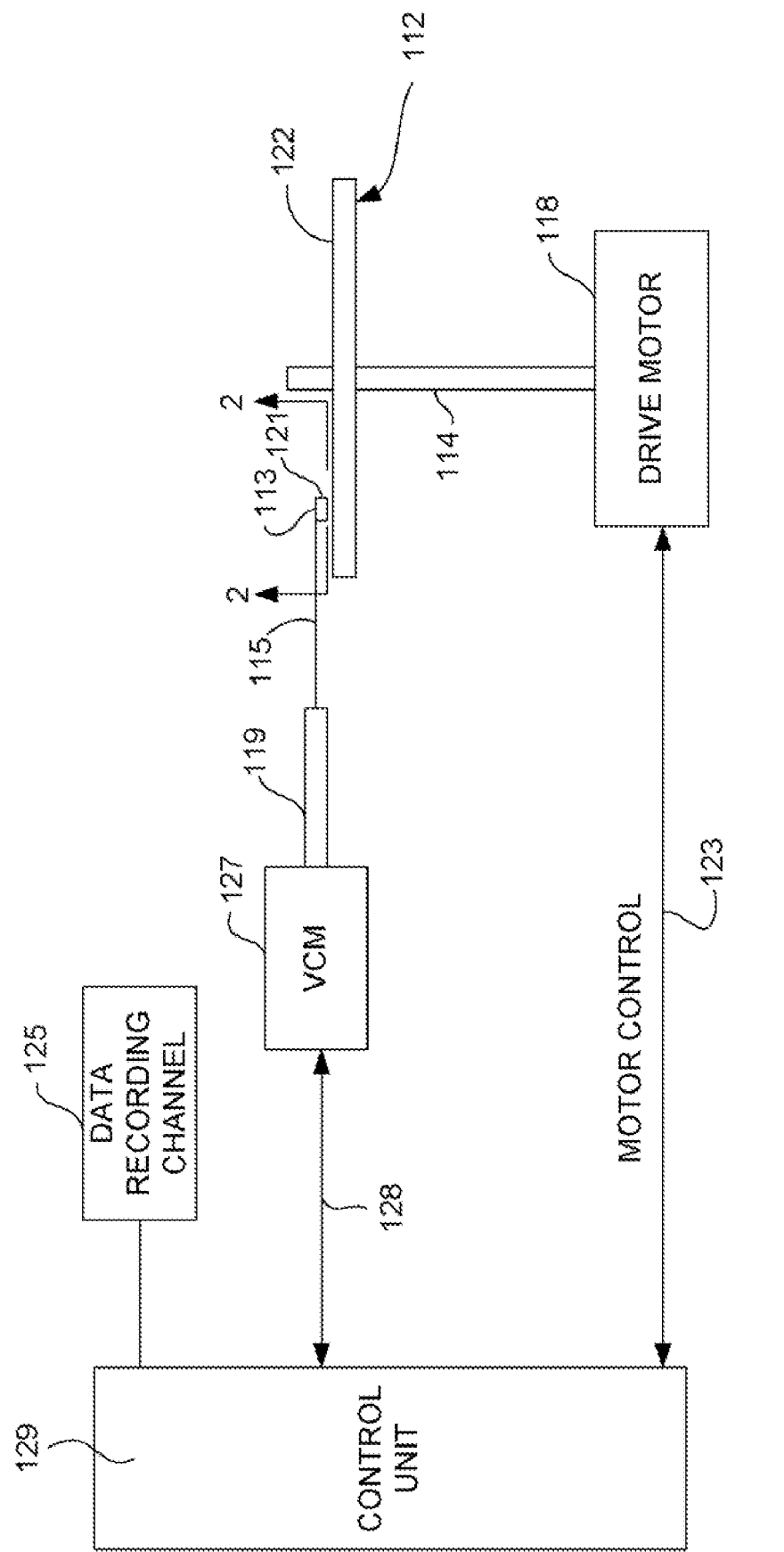
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported oil a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic bead assembly 121 may access different track s of the magnetic disk where desired data are written. Each slider 113 is attached to an actuator arm 119 by way of suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift an the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
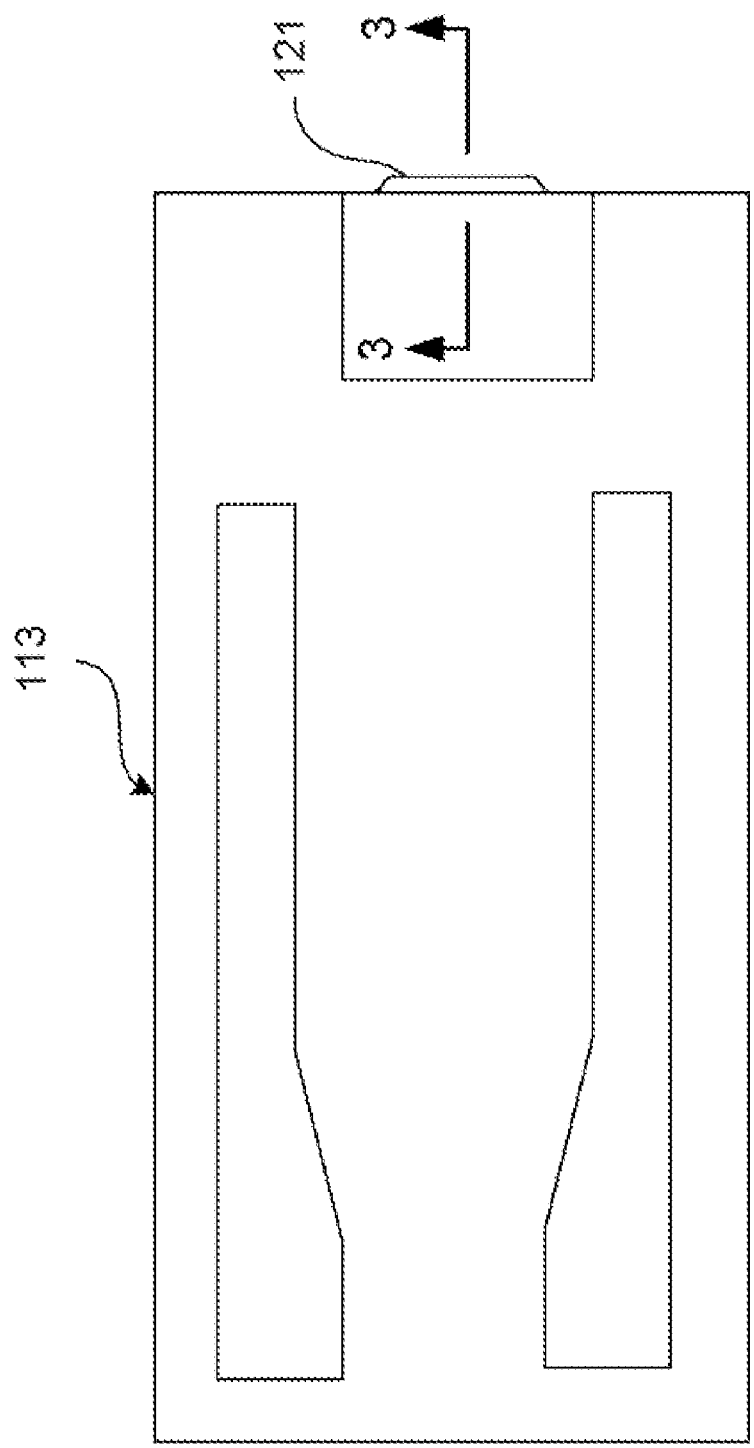
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
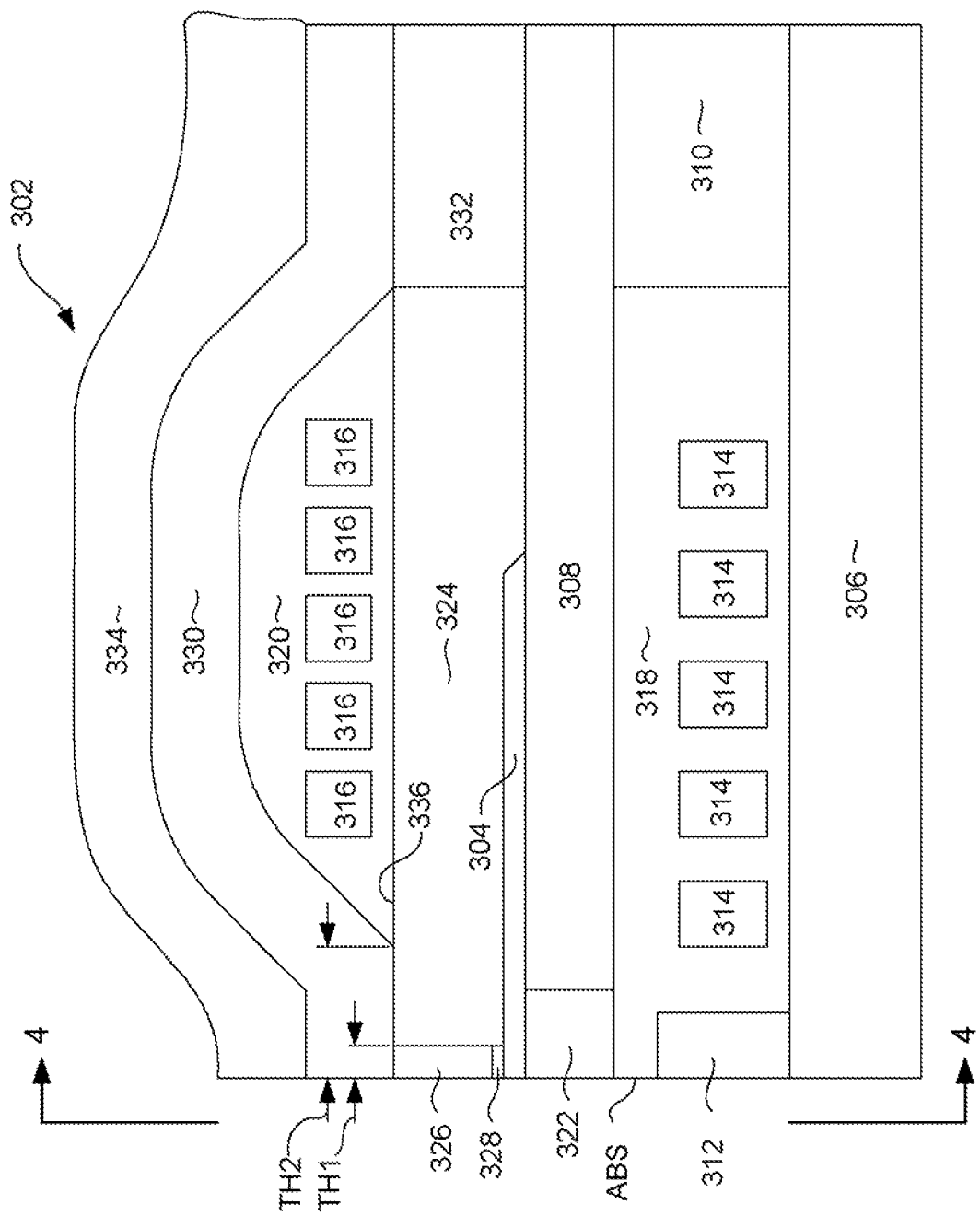
FIG. 3 is a cross sectional view view, taken from line 3-3 of FIG. 2 and rotated 90 degrees counterclockwise, of a magnetic head according to an embodiment of the present invention.

With reference now to FIG. 3, the invention can be embodied in a write head 302. The write head 302 includes a magnetic write pole 304 and a first or bottom magnetic return pole 306. The write pole 304 can be constructed on a magnetic shaping layer 308. The bottom return pole 306 is magnetically connected with the shaping layer 308 and with the write pole 304 by a first magnetic back gap structure 310. The write pole 304 and first return pole extend to an air bearing surface (ABS). A magnetic pedestal 312 may extend from the trailing edge of the first return pole 306 at the ABS. This pedestal can be useful in preventing stray fields from inadvertently reaching the magnetic medium (not shown). The first return pole 308, first back gap 310, shaping layer and pedestal 312 can be constructed of a material such as NiFe or CoFe. The write pole 304 can be constructed of a high moment magnetic material such as CoFe, and is preferably a laminated structure comprising layers of CoFe separated by thin layers of non-magnetic material.

With reference still to FIG. 3, the write head 302 includes first and second coil portions 314, 316, shown in cross section in FIG. 3, which can be constructed of an electrically conductive material such as Cu. The first and second coil portions 314, 316 can be upper and lower portions of a common helical coil, or can be separate pancake type coils. The first coil portion 314 is embedded in a dielectric material 318, which can be a combination of hard baked photoresist and an alumina fill layer. The second, or upper coil portion 316 is embedded in an upper coil insulation 320 that, as shown in FIG. 3, is hard baked photoresist. The write head 302 can include other non-magnetic, electrically insulating fill layers such as an alumina ($Al_2O_3$) fill layer 322 between the shaping layer 308 and the ABS, and a planarized fill layer 324 above the write pole 304 and shaping layer 308.

Figure 4:
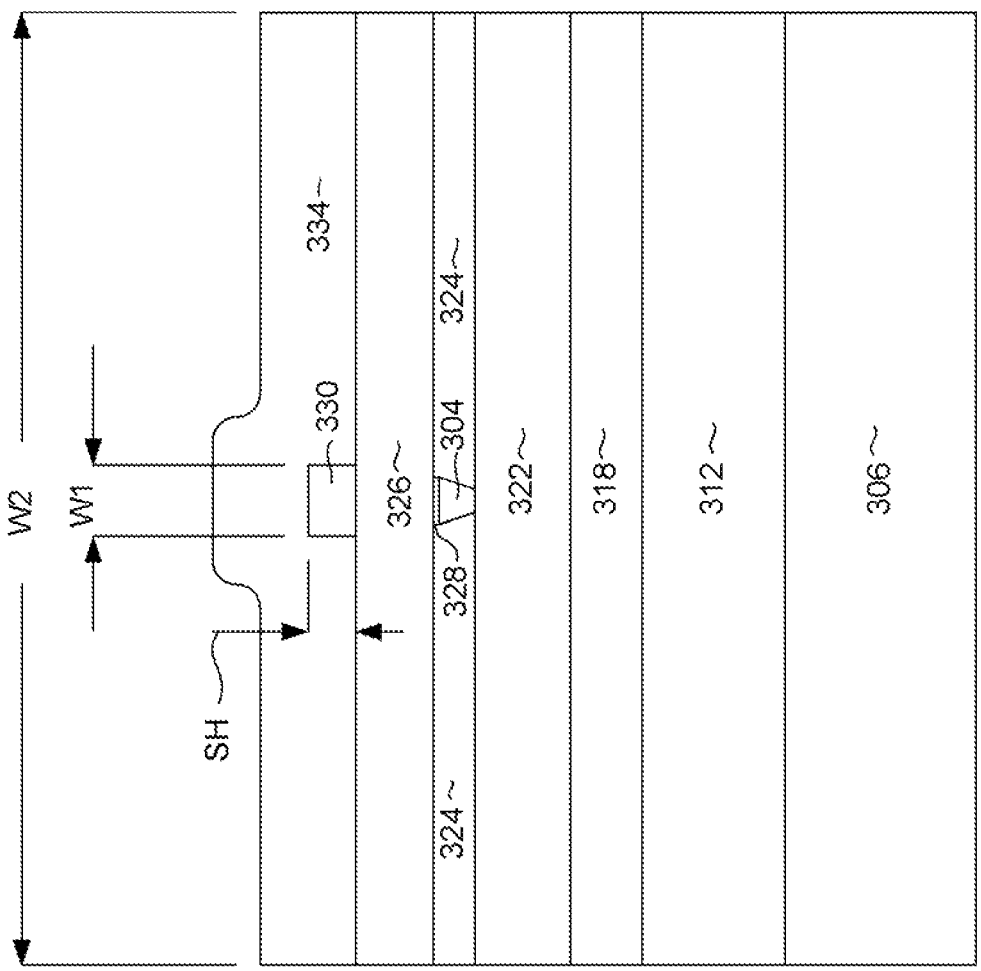
FIG. 4 is an ABS view of the write head taken from line 4-4 of FIG. 3.

With reference FIGS. 3 and 4, the write pole includes a trailing magnetic shield 326, which is separated from the trailing edge of the write pole 304 by a trailing gap 328. The trailing shield 326 can be constructed of a magnetic material such as NiFe or CoFe and the trailing gap can be constructed of a non-magnetic material such as alumina ($Al_2O_3$), Ph, etc.

A second, or upper, return pole 330 contacts the trailing shield 326 and as seen in FIG. 3, the second return pole 330 magnetically connects the trailing shield 326 with a second back gap portion 332. Therefore, as can be seen, the trailing shield 326, write pole 304 and return pole 306 are all magnetically connected with one another in a region removed from the ABS. A protective layer 334 of, for example, alumina can be provided over the top of the upper return pole 330 to protect the elements of the write pole 302 from corrosion or other damage.

With reference to FIG. 3, the trailing shield 326 and fill layer 324 have a coplanar surface 336 that provides a substrate on which a front (or throat) portion of the upper return pole 330 sits. The trailing shield has a throat height TH1 as measured from the ABS to its back edge. The upper return pole 330 has a throat height TH2 measured from the ABS. As can be seen, the upper return pole contacts the surface 336 formed by the trailing edge of the trailing shield 326 and fill layer 324. The throat height TH2 is measured from the ABS to the point at which the tipper return pole 330 breaks away from the surface 336 to taper up over the coil 316. In other words, the trailing shield TH2 is defined by the length of the portion of the upper return pole 330 that contacts the surface 336.

As discussed above in the Background of the Invention, prior write heads have suffered from trailing shield protrusion. In prior art write heads, mechanically abrasive cleaning processes such as soda blast are used to clean the ABS. Damage occurs because the aggressive cleaning process pushes against the upper return pole 330 causing it to recess into the ABS (to the right as shown in FIG 3.). As can be seen, the trailing shield 326 is braced by the fill layer 324 which, (being constructed of alumina) is very hard. The hard alumina fill layer 324, therefore, prevents the shield 326 from being deformed or recessed by the soda blast operation. However, the hard baked photoresist fill layer 320 covering the upper coil portion 320 is not nearly as hard or resistant to deformation as the alumina fill layer 324. Therefore, the fill layer 320 does not support the upper return pole 330 from deformation as well as the fill layer 324 protects the trailing shield 326. Were it not for the novel return pole design provided by the present invention, the upper return pole 330 would be deformed and recessed at the ABS, leading to trailing shield protrusion.

As can be seen with reference to FIG. 3, the throat height TH2 of the upper return pole is substantially large. This large throat height TH2 prevents the pole tip portion of the upper return pole 330 from deforming during mechanically abrasive cleaning operations such as soda blast. The throat height TH2 of the upper return pole 330 is preferably equal to or greater than 5 times the throat height TH1 of the trailing shield. More preferably TH2 can be about 25 times TH1. For example, the trailing shield throat height TH1 can be about 100 nm, and the throat height TH2 of the upper return pole 330 would then be greater than 2500 nm or about 2500 nm as measured from the ABS.

With reference now to FIG. 4, the upper return pole 330 has a width W1 at the ABS that is much narrower than the width W2 of the trailing shield 326. For example, the width W1 can be less than ½ W2. This narrow width of the upper return pole 334 further reduces soda blast induced recession of the upper return pole 330 by reducing the surface area against which the soda blast (or other process) can act. The width W1 can be, for example, 1.5-2.5 times its stack height thickness SH measured from its trailing edge to its leading edge.

Figure 5:
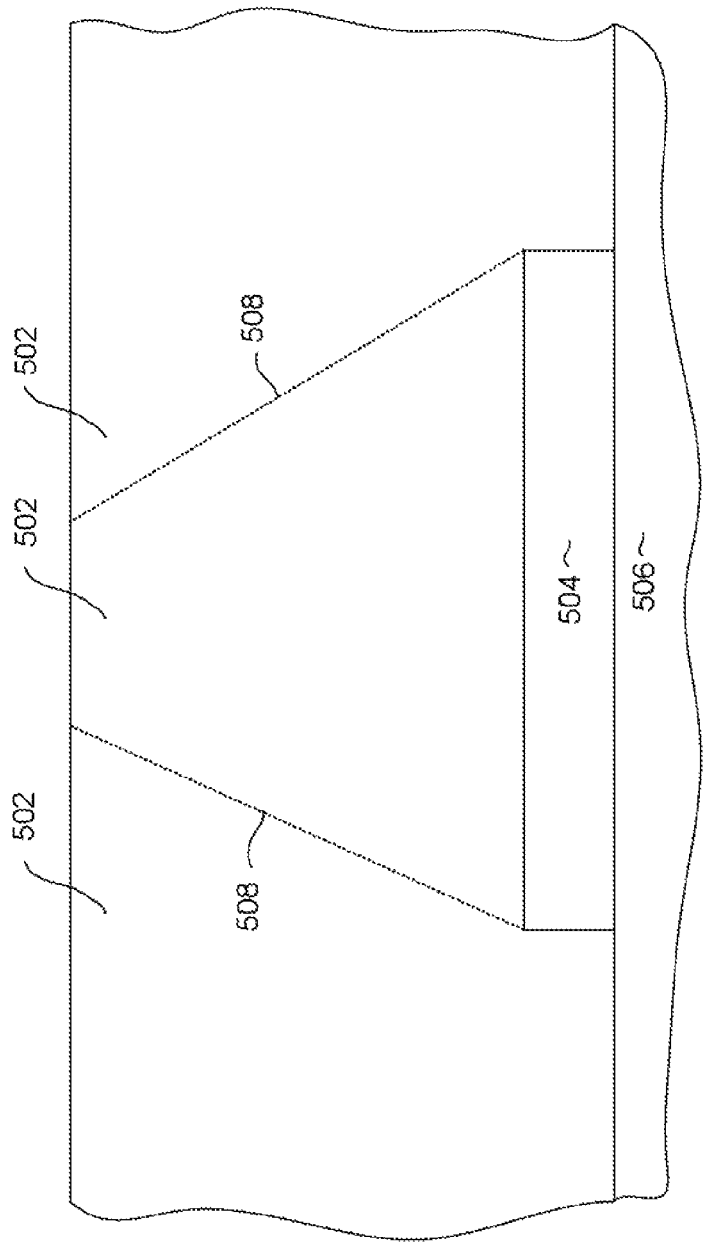
FIG. 5 is an ABS view of a return pole and protective over-layer showing seam formation in a prior art head.

This decreased width of the upper pole 330 provides another advantage in addition to that of preventing recession of the upper return pole 330. As can be seen with reference to FIG. 5, a protective layer 502 can be deposited over a return pole 504, the return pole 504 being formed over a trailing shield 506. The deposition of the protective layer (such as alumina) can lead to seams or voids 508, which are shown in dotted line in FIG. 5. As the alumina 502 is deposited over the return pole 504 the topography of the return pole causes the deposited alumina to form seams or voids 508 which converge at some point above the return pole. If the return pole is wide, this point of convergence is a substantial distance above the return pole. These seams 508 become even more pronounced after the mill or reactive ion etch (RIE) due to varying removal rates of different materials. Such seams or voids 502 are undesirable because they provide locations for the collection of debris and can contribute to corrosion of the write head.

Figure 6:
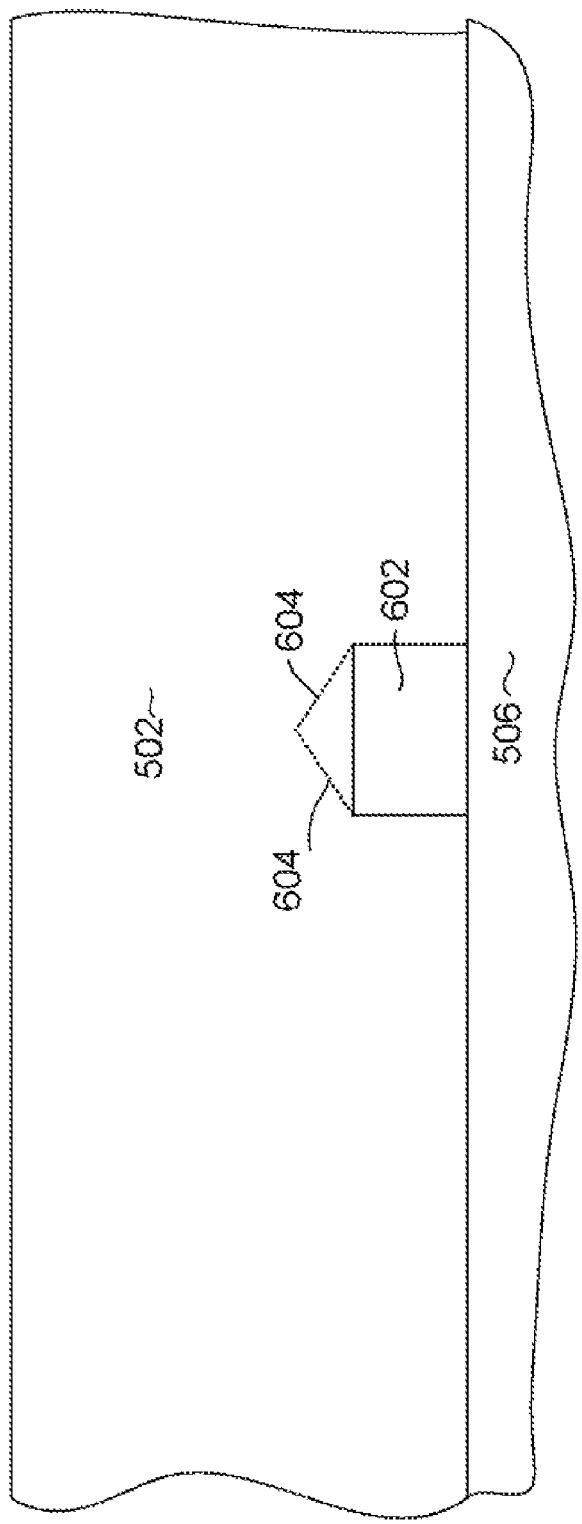
FIG. 6 is an ABS view of a return pole and protective layer according to an embodiment of the invention.

With reference to FIG. 6, however, because the upper return pole 602 is narrow as viewed from the ABS, any seams or voids 604 merge at a point very close to the upper return pole 602. In fact the seams converge so close to the upper return pole, that they are protected from mill or RIE during slider processing and consequently are not exposed.

Figure 7:
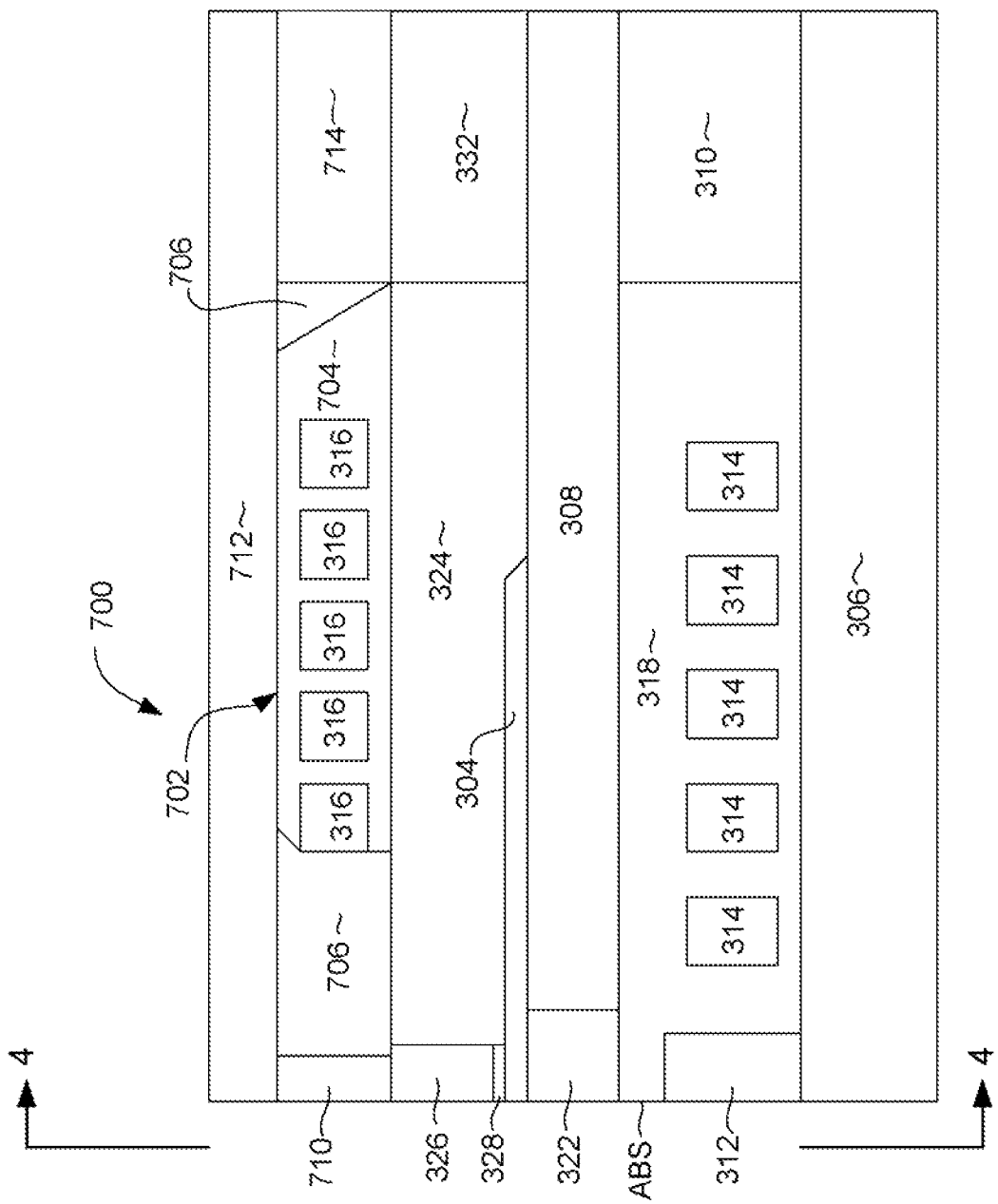
FIG. 7 is a cross sectional view of a write head according to an alternate embodiment of the invention.

With reference now to FIG. 7, a write head 700 according to an alternate embodiment of the invention includes a novel bi-layer fill layer in 702. This bi-layer fill layer can include a hard baked photoresist coil insulation layer 704 and a hard fill layer portion 706 that is preferably constructed (of alumina ($Al_2O_3$). The upper return pole structure 708 can be a two piece structure that includes a pedestal portion 710 disposed at the ABS and a main portion 712 that extends from the pedestal 710 to a third back gap portion 714. The third back gap portion 714 and pedestal portion 710 can be formed together in a common patterning and plating step.

The pedestal 710 back gap 714 and main pole portion 712 can be constructed of a magnetic material such as NiFe, CoFe etc. and may be the same or different materials. As can be seen in FIG. 7, the hard fill layer portion 706 braces the pedestal portion 710 against the soda blast or other cleaning processes. Because the layer 706 (preferably alumina) is very hard, it provides a very effective support for the pedestal 710. On the other hand, the main pedestal portion 712 extends all of the way back to the back gap portion 714 and, therefore, provides its own brace against the deformation from the cleaning process. Therefore, the embodiment described in FIG. 7 provides effective protection against trailing shield recession (and similarly against write pole protrusion).

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head, comprising:
   a magnetic write pole having an end disposed toward an air bearing surface;
   a magnetic trailing shield separated from the write pole by a non-magnetic trailing gap, the trailing shield having a trailing edge and having a front edge exposed at the air bearing surface and a back edge opposite the front edge, the distance between the front and back edges of the trailing shield defining a trailing shield throat height; and
   a non-magnetic fill layer contacting the back edge of the trailing shield and having a surface, the surface of the fill layer and the trailing edge of the trailing shield forming a coplanar surface; and
   a magnetic return pole contacting the coplanar surface in a region that defines a return pole throat height the throat height of the return pole being at least 5 times the throat height of the trailing shield.

2. A write pole as in claim 1 wherein the return pole tapers away from the coplanar surface in a region beyond the return pole throat height.

3. A write pole as in claim 1 wherein the return pole throat height is about 25 times the trailing shield throat height.

4. A write pole as in claim 1 wherein the return pole has a width as viewed from the air bearing surface that is significantly less than a width of the trailing shield as viewed from the air bearing surface.

5. A write pole as in claim 1 wherein the return pole has a width W1 and the trailing shield has a width W2 and wherein W1 is less than ½ W2.

6. A write head as in claim 1 wherein the non-magnetic fill layer comprises alumina ($Al_2O_3$).

7. A magnetic write head for perpendicular magnetic data recording, comprising:
   a magnetic write pole having an end disposed at an air bearing surface and having a trailing edge;
   a first magnetic return pole having an end disposed at an end disposed toward the air bearing surface and an end disposed away from the air bearing surface;
   a first magnetic back-gap structure contacting the return pole at the end of the return pole that is disposed away from the air bearing surface;
   a magnetic shaping layer magnetically connecting the write pole with the first magnetic back gap structure, the shaping layer being recessed from the ABS;
   a first, electrically conductive coil portion extending between the magnetic shaping layer and the first magnetic return pole, the coil being separated from the shaping layer, first return pole and first back gap portion by a first insulation layer;
   a magnetic trailing shield formed adjacent to the write pole, the magnetic trailing shield being separated from the trailing edge of the write pole by a non-magnetic trailing gap layer, the trailing shield having a trailing edge opposite the write pole and having a front edge exposed at the air bearing surface and a back edge opposite the air bearing surface, the distance between the front and back edges of the trailing shield defining a trailing shield throat height;
   a hard, non-magnetic fill layer contacting the back edge of the trailing shield, the non-magnetic fill layer having a surface, the surface of the hard, non-magnetic fill layer and the trailing edge of the trailing magnetic shield together defining a coplanar surface;
   a second electrically conductive coil portion disposed above the coplanar surface; and
   a second magnetic return pole having a front end exposed at the air bearing surface and a back end opposite the air bearing surface, the second magnetic return pole first portion disposed toward the air bearing surface that contacts the coplanar surface, and a second portion that separates from the coplanar surface to extend over the second coil portion, the length of the first portion of the second return pole defining a second return pole throat height, the second return pole throat height being at least 5 times the trailing shield throat height.

8. A magnetic write pole as in claim 7 wherein the second return pole throat height is about 25 times the trailing shield throat height.

9. A magnetic write pole as in claim 7 wherein the hard, non-magnetic fill layer comprises alumina.

10. A magnetic write head as in claim 7 further comprising a second magnetic back gap structure that magnetically connects the second return pole with the shaping layer in a region removed from the air bearing surface.

11. A magnetic write head for perpendicular magnetic recording, comprising:
    a magnetic write pole having an end disposed at an air bearing surface and having a trailing edge;
    a trailing magnetic shield adjacent to the write pole, the trailing magnetic shield having a front edge disposed at the air bearing surface and a back edge opposite the front edge, the distance between the front and back edges defining a trailing shield throat height, the trailing shield also having a trailing edge opposite the write pole and extending from the front edge to the back edge;
    a non-magnetic trailing gap separating the trailing shield from the trailing edge of the write pole;
    a first non-magnetic fill layer contacting the back edge of the trailing shield and extending away from the air bearing surface, the first fill layer having a surface that forms a coplanar surface with the trailing edge of the trailing shield;
    a first magnetic return pole portion extending from the trailing edge of the trailing shield;
    a second return pole portion magnetically connected with the first return pole portion and extending away from the air bearing surface;
    a second fill layer comprising alumina disposed between the coplanar surface and the second return pole portion, the second fill layer contacting first return pole portion; and
    an electrically conductive write coil passing between the coplanar surface and the second magnetic return pole portion.

12. A write head as in claim 11 wherein the second fill layer braces the second return pole portion against recession.

13. A write pole as in claim 11 wherein the second fill layer extends from the first return pole portion to the coil.

14. A write pole as in claim 11 further comprising a hard baked photoresist insulation surrounding at least a portion of the coil and wherein the second fill layer extends from the first return pole portion to the coil.

15. A write head for perpendicular magnetic recording, comprising:
    a magnetic write pole having an end extending to an air bearing surface and having a trailing edge;
    a lower magnetic return pole having an end extending to the air bearing surface, the lower magnetic return pole being magnetically connected with the write pole in a region away from the air bearing surface;
    a first electrically conductive coil portion passing over the lower magnetic return pole;
    a trailing shield disposed at the air bearing surface and separated from the trailing edge of the write pole by a non-magnetic trailing gap;
    a first alumina fill layer formed adjacent to the trailing shield;
    an upper magnetic return pole pedestal portion having a front edge disposed at the air bearing surface and a back edge disposed away from the air bearing surface;
    a second alumina fill layer formed over the first alumina fill layer and contacting the back edge of the upper magnetic return pole pedestal portion; and
    an upper magnetic return pole main portion contacting magnetic return pole pedestal portion and extending over the second alumina fill layer.

16. A magnetic write head as in claim 15 further comprising a second electrically conductive coil portion passing between the upper magnetic return pole main portion and the first fill layer.

17. A magnetic write head as in claim 15 further comprising a second electrically conductive coil portion passing between the upper magnetic return pole main portion and the first fill layer, and wherein the second fill layer extends from the upper return pole pedestal portion to the second write coil portion.

18. A magnetic write head as in claim 15 wherein the upper magnetic return pole main portion is magnetically connected with the write pole and the lower magnetic return pole in a region removed from the air bearing surface.

19. A magnetic write head as in claim 15 further comprising a second electrically conductive coil portion passing between the upper magnetic return pole main portion and the first fill layer, and further comprising a hard baked photoresist insulation layer surrounding at least a portion of the second electrically conductive coil portion.

20. A magnetic write head as in claim 1 wherein the return pole has a width (W1) and a stack height thickness (SH), and wherein W1 is 1.5 to 2.5 times SH.

* * * * *